United States Patent Office 3,515,522
Patented June 2, 1970

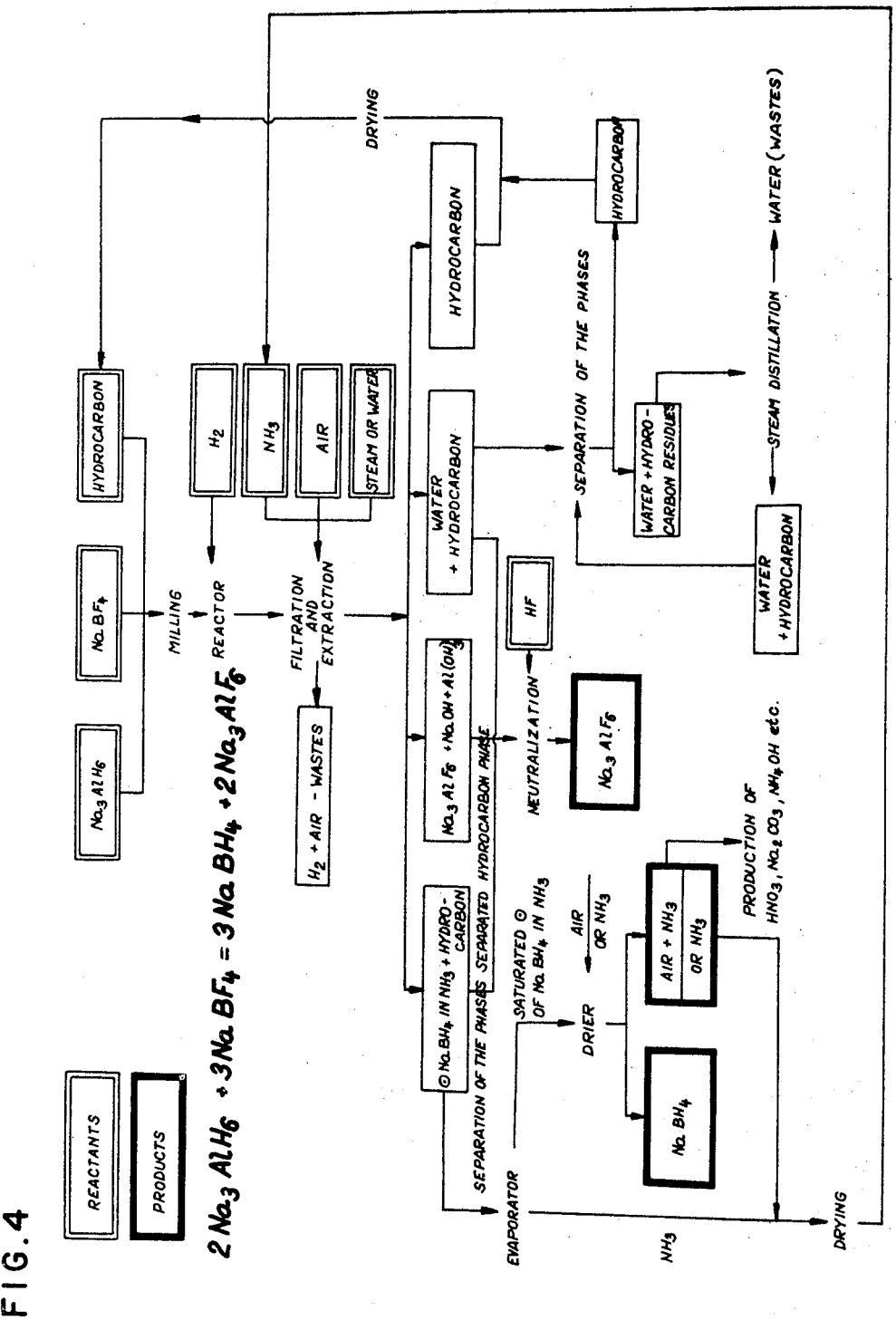

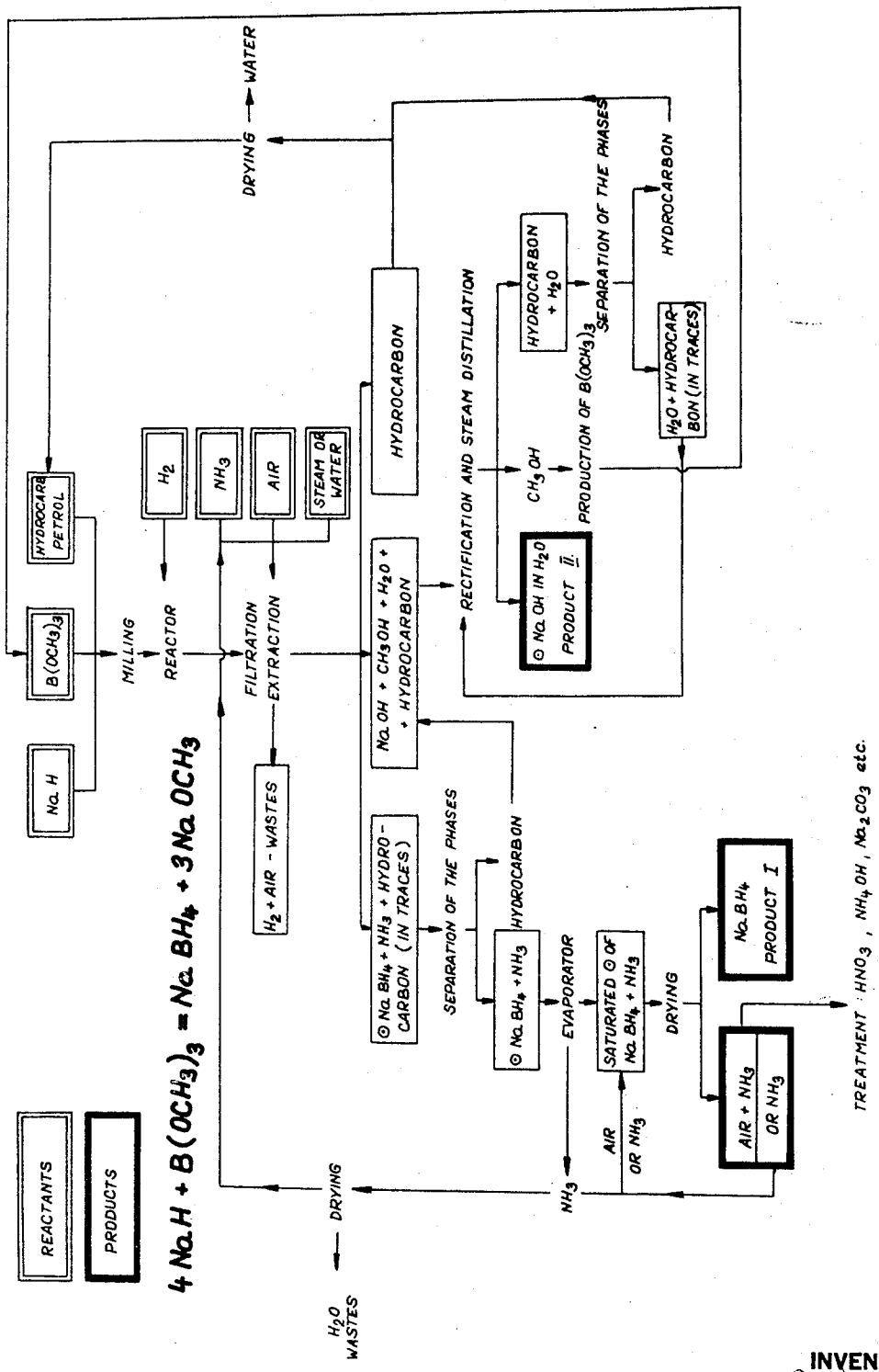

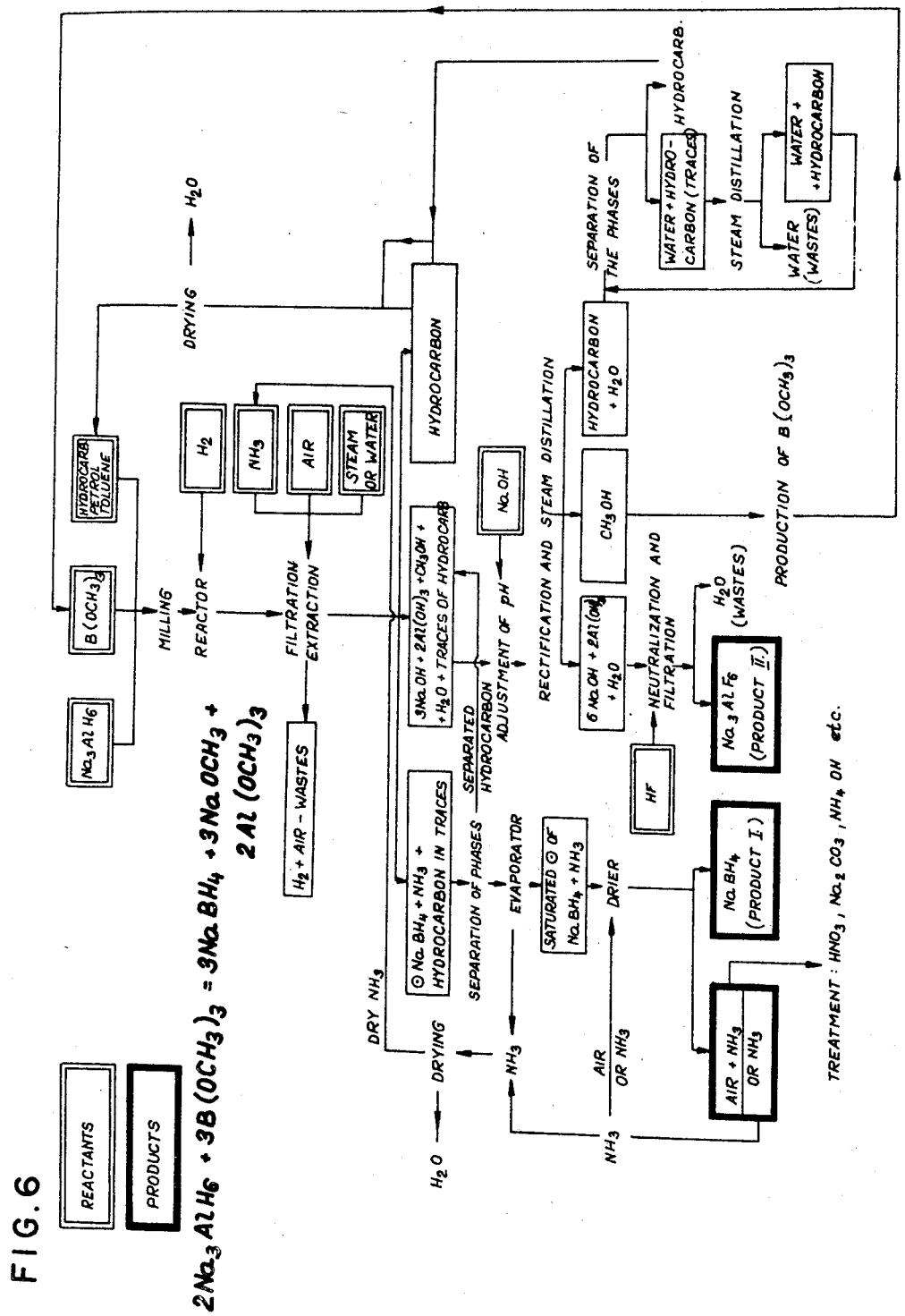

3,515,522
METHOD OF PRODUCING ALKALI METAL BOROHYDRIDES
Vaclav Pecak, Jaroslav Vit, and Vladimir Prochazka, Prague, Czechoslovakia, assignors to Ceskoslovenska Akademie Ved, Prague, Czechoslovakia
Continuation-in-part of application Ser. No. 585,216, Sept. 22, 1966. This application Aug. 8, 1967, Ser. No. 659,222
Claims priority, application Czechoslovakia, Aug. 13, 1966, 5,358/66; Oct. 24, 1966, 6,766/66
Int. Cl. C01b 6/14
U.S. Cl. 23—363     12 Claims

ABSTRACT OF THE DISCLOSURE

Alkali metal borohydrides, particularly sodium and potassium borohydrides are produced by forming a thin layer of a suspension in a liquid which is inert with respect to the reactants and the reaction product, of an alkali metal hydride which may be a sodium or potassium hydride, or a sodium or potassium aluminum hydride, and of a boron compound capable of reacting with the hydride under formation of the alkali metal borohydride and subjecting the thin layer of the suspension to a sufficiently high temperature so as to react the hydride and the boron compound under formation of the alkali metal borohydride. It is essential that the layer which is thus reacted is sufficiently thin so that the reaction will occur substantially simultaneously throughout the entire reacting cross section of the layer, thereby preventing contact and possibly reaction between the reaction produce and as yet unreacted reactants.

Cross-references to related applications

This application is a continuation-in-part of our copending application Ser. No. 585,216, filed Sept. 22, 1966 now abandoned, and entitled "Method and Apparatus for Producing Alkali Metal Borohydrides." Application Ser. No. 585,216 is a continuation-in-part of our copending application Ser. No. 576,708, filed Sept. 1, 1966, and entitled "Process for Preparing Borohydrides," now abandoned.

Background of the invention

This invention is concerned with a novel process for preparing borohydrides. More particularly the present invention is concerned with an improved process for preparing alkali metal borohydrides by reacting an alkali metal hydride or a sodium-aluminum hydride with a boron compound, if required, in the presence of hydrogen.

Heretofore it has been practically impossible to prepare alkali metal borohydrides by a continuous process. Industrial production has been essentially limited to two processes for preparing sodium borohydride. One of the procedures is that disclosed in U.S. Pat. No. 2,461,661 involving the reaction of sodium hydride with methyl borate in mineral oil at a temperature of from 250 to 270° C. The other procedure involves the reaction of sodium hydride with boric oxide in the presence of silicon and has been described in German Pat. No. 1,053,476. Neither process has proved adaptable to continuous production methods.

A very advantageous process for the production of sodium borohydride is known which is carried out by reacting sodium hydride with sodium fluoroborate in mineral oil in the presence of hydrogen at a temperature of up to 360° C. and a pressure of 10 atmospheres. In order to carry out the reaction, numerous safety precautions have to be observed. The reaction in any event gives rise to so many inconveniences as, for instance, a relatively slight and momentary exceeding of the limiting temperature, i.e., 360° C. results in a serious decrease in yield that the process has not proved industrially feasible.

Heretofore when the alkali metal or alkali metal hydride, boron compound and hydrogen were reacted, the reaction has always been carried out with the reaction mixture in the form of a bulk suspension. On heating the reaction mixture to the temperature required to initiate the reaction, the portion of the reaction mixture which has reached such temperature, thereupon reacts with unreacted reaction components whereby the final yield of desired product was lowered and a still further portion of the reaction components kept from entering into the desired reaction thus further decreasing the yield. Furthermore, the borohydride product recovered was badly contaminated with the byproducts produced in the reaction of the reaction products with the reactants:

$$3MeBH_4 + MeBF_4 \rightarrow 4MeF + 4B + 6H_2$$

Until the present invention, the reason for the disadvantages associated with the known method of preparing borohydrides starting from fluoroborates and metal hydrides apparently had not been understood. All that was known was that the cheapest and presumably most advantageous route resulted in poor yields of a badly contaminated product, and low price of the reactants not being sufficient to compensate for the poor yields and expensive refining procedures involved. For instance, when reacting $B(OCH_3)_3$ with 4NaH, $NaBH_4$ and $3CH_3ONa$ are formed. However, unreacted $$B(OCH_3)_3$$

will undesirably react with the $CH_3ONa$ formed by the above reaction and will form $NaB(OCH_3)_4$. Reversal of this undesirable side reaction causes difficulties.

It is an object of the present invention to provide a new and improved method for the preparation of alkali metal borohydrides which may be carried out in a continuous manner.

Summary of the invention

The present invention is concerned with a method of producing alkali metal borohydrides selected from the group consisting of sodium and potassium borohydrides, comprising the steps of forming a thin, flowable layer consisting essentially of a suspension in a liquid of a first reactant consisting of a finely subdivided alkali metal hydride selected from the group consisting of sodium and potassium hydrides, sodium and potassium aluminum hydrides and mixtures thereof, and of a second reactant consisting of a finely subdivided boron compound selected from the group consisting of (a)

$$MeBH_xF_{(4-x)}$$

wherein $x$ is an integer between 0 and 3 both inclusive, and mixtures thereof, and (b) $MeB(OCH_3)_4$, $$MeBH(OCH_3)_3$$

and the methyl esters of boric acids, and mixtures of the compounds listed under (b), wherein in (a) and (b) Me is sodium or potassium, the liquid being inert with respect to the boron compound, metal hydride and alkali metal borohydride, and subjecting the thin layer to an elevated temperature sufficiently high to cause reaction between the metal hydride and the boron compound and formation of the alkali metal borohydride, the flowable layer being sufficiently thin to assure substantially simultaneously reaction through any reacting cross section thereof thereby substantially preventing contact and reaction between the thus formed reaction product and the reactants.

The present invention is also concerned with the recovery of the thus obtained alkali metal borohydride.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawings

FIGS. 3–6 are flow sheets illustrating various preferred embodiments of the process of the present invention.

Description of the preferred embodiments

Figure 1:
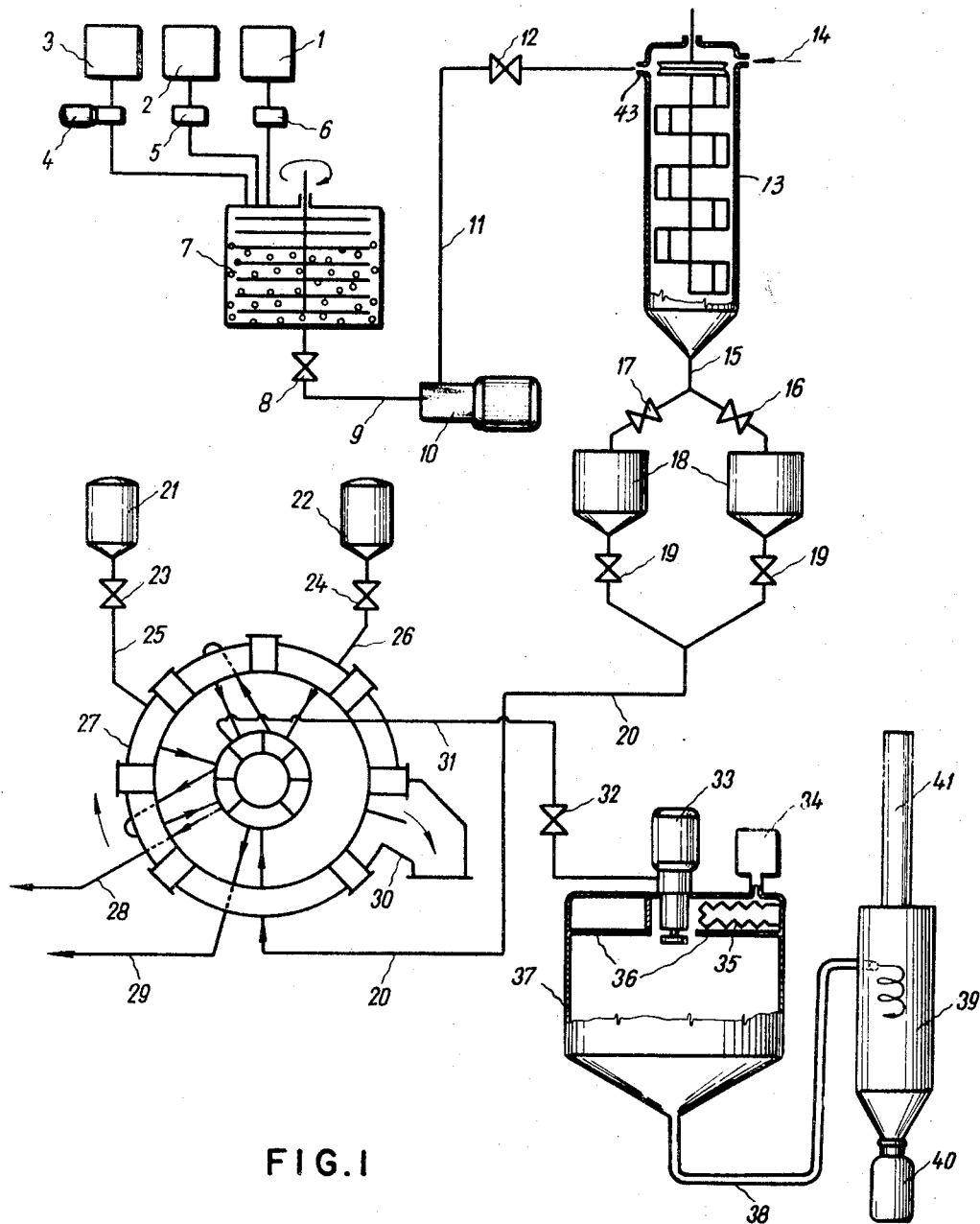
FIG. 1 is a flow sheet illustrating the process of the present invention and an arrangement for carrying out the same.

In accordance with the invention it has been found that all of the disadvantages of the art are avoided if the reaction is carried out with the reactants in the form of a thin layer, such as a layer having a thickness of between 0.1 and 40 mm. Under the term "thin layer" is to be understood any layer with a cross section between two walls or between a wall and a gaseous phase having a thickness within this range. The reactants are in bulk only during the homogenization which is effected at a temperature of from 0 to 50° C., i.e., at a temperature at which no reaction is possible. It is only after the homogenization and after the formation of a thin layer of the reactants takes place that the reaction mixture is brought to the temperature at which reaction takes place. The reactants are preferably used in a finely divided state with a specific surface of at least 1.4 sq. m./g. in a hydrocarbon oil suspension which acts as a non-Newtonian fluid.

The shape of the above mentioned cross section of said flowable layer may vary, provided that the flowable layer of finely divided reactants suspended in a hydrocarbon oil is sufficiently thin to assure substantially simultaneous reaction throughout the cross section thereof so as to substantially prevent contact and reaction between the thus formed sodium or potassium borohydride and the starting reactants. This is possible because the reaction between the two solid reactants proceeds at a surprisingly high rate as soon as the reaction temperature has been reached.

The thin layer, for instance, may be formed on the outer wall of a cylindrical heated tube, or on the outer wall of a plurality of such tubes, on the inner wall of a reaction vessel which may be stationary or rotatable or between adjacent walls.

The liquid preferably will be a hydrocarbon of the type described more fully further below.

The present invention also includes an apparatus for preparing alkali metal borohydrides, comprising a stationary vertically disposed cylindrical vessel, means for maintaining the upper part and lower part of the stationary vessel at different temperatures, a system of rotatable vertically disposed surfaces within the vessel, means for rotating the rotatable surface to cause the liquid containing reactants to be distributed on the internal surface of the vessel in the shape of a thin film, means for introducing liquid containing reactants to be reacted on contact with the heated surface maintained at the elevated temperature for conversion of the reactants, means for passing a gas into the vessel and outlet means for product produced in the reaction.

In accordance with the invention the reactants in the form of a thin layer may proceed in any suitable direction, preferably downwardly, the temperature of the reaction mixture being brought to the value at which the reaction takes place. The reaction is immediate, taking place simultaneously throughout the entire cross section of the reaction zone. As a result the product is not presented with any possibility of contact with unreacted material as at the point where it has been formed, no reactants are any longer present.

The thickness of the film inside the reactor need not be constant. Such is the case for instance in conical reactors, where, in the preheating zone, the thickness of the film may be higher than optimum thickness for the reaction. In the reaction zone, however, and, preferably, also before the said reaction zone, the optimum thickness should be achieved. The thickness of the film varies, of course, due to reduced viscosity within the reactor at increasing temperatures in any case. In reactors that are provided with agitators, which are not in contact with the wall of the reactor, the thickness of the film is determined by the gap between the blades of the stirrer and the wall; in case of a limited injection, it is constant for the respective cross section. For larger amounts of injected suspension the thickness of the film is variable—it is higher upstream of the agitator blade. For reactors with blades freely hinged on the agitator shaft, which are in contact with the wall due to centrifugal force, the thickness of the film is again variable. This system is, with respect to heat transfer, more efficient due to higher turbulence inside the film. The film inside the reactor may also be formed without any agitator, for instance between two surfaces. In such a case, a reactor similar to a plate heat exchanger can be used. The direction in which the film proceeds may be arbitrary. In plate reactors with an ascending flow of the suspension a gas, for instance hydrogen, may be introduced at a suitable point in order to interrupt the continuous film between the surfaces, so that the undesirable reaction between the products and the starting reactants can be prevented. The film can also be created by centrifugal force on a rotating heated surface. Use may be also made of gravitational forces to cause the flow of the suspension within vertical or inclined reactors.

The crude reaction product thereby formed is thereafter separated from the oil and the borohydride extracted from the solid phase, e.g., with an amine or with liquid ammonia; it is also possible to extract the prepared borohydride from the oil suspension without previous separation of the oil by using an extracting agent which is immiscible with oil, for instance liquid ammonia.

Use may be made in the extraction process of the following amines instead of ammonia, for instance: methylamine, ethylamine, n-propylamine, isopropylamine, pyridine, cyclohexylamine, etc. Water or lower aliphatic alcohols like methanol, ethanol, etc. may also be used, but must be alkalized before using with NaOH, $Na_2CO_3$, or with metal alcoholates, preferably 1–10% by weight. If the solvent used for the extraction is miscible with said hydrocarbon liquid, the latter must be previously removed.

The ammonia, amine or other solvent extract is fed into a spray drier, or into a film evaporator. Air may be used to advantage as a gaseous medium in a spray-drier, in case the concentration of the solvent in the outgoing gaseous mixture is beyond the explosion limit, and provided that the drying is carried out at a temperature that lies below the temperature of ignition. The composition of the outgoing mixture can be also within the explosion limits provided that the temperature of self-ignition of the gaseous mixture is not exceeded. Overheated vapors of the solvent applied may be also used to advantage as gaseous drying medium. Any other inert medium may be of course used, as for instance nitrogen, argon, and the like.

As starting materials there may be used the said sodium or potassium metal and/or a hydride of the said alkali metal together with the said boron-containing compound, e.g., sodium or potassium fluoroborate. If the metal is used (Na or K), hydrogen must be present to form the corresponding hydride in situ.

While the reaction of a fluoroborate of a metal with a hydride of the same metal to form that metal borohydride was known, i.e., the preparation of sodium borohydride from sodium fluoroborate and sodium hydride, it is believed that the preparation of borohydrides by reacting an alkali metal fluoroborate with a different alkali metal hydride or a free different alkali metal was not heretofore known and is novel. Thus the following reactions are now possible with the same highly advantageous results:

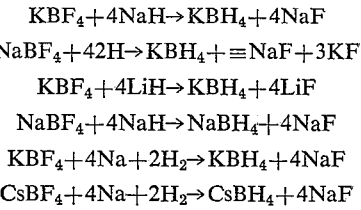

which may be rewritten in form of the following general equations:

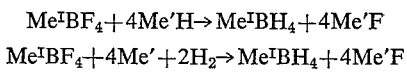

etc.

It has been found that if one reactant contains potassium and the other sodium, always the potassium borohydride will be formed. Generally, it may be stated that any mixture of reactants with different alkali metals results in a borohydride of that metal which has more positive character.

What has been hitherto known and described in this respect may be expressed in terms of the following reaction schemes:

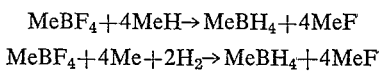

The advantage of this novel feature of the invention lies in the fact that sodium hydride or sodium metal may be used as one of the reactants for the production of many borohydrides, e.g., for the production of potassium borohydride. Sodium hydride and/or sodium metal together with the fluoroborate of that metal, the hydride of which is to be produced, represent the cheapest possible combination of reactants in the production of many borohydrides.

The novel process of the invention is preferably carried out by introducing the starting materials into a homogenizing or milling zone wherein these reactants are milled, separately, or preferably together, or the milling is effected in an oil, i.e., mineral oil as a suspending medium. Such mineral oils, may be hydrocarbons such as paraffinic, cyclo-paraffinic or aromatic hydrocarbons having a critical temperature above the reaction temperature at which the borohydrides are formed. Such hydrocarbons may, or may not be steam distillable. Of the aromatic and alicyclic hydrocarbons, especially those with from 6 to 10 carbon atoms in the molecule, of the aliphatic hydrocarbons, the hydrocarbons with from 7 to 20 carbon atoms in the molecule are best suitable.

Especially advantageous are steam distillable hydrocarbons such as aliphatic hydrocarbons with from 7 to 10 carbon atoms in the molecule, for instance heptanes, octanes (e.g., n-octane and iso-octane), nonanes, decanes, or certain mixtures, e.g., lacquer benzene and aromatic and cyclo-paraffinic hydrocarbons, e.g., hexane, benzene, toluene and xylenes.

The suspension formed is thereafter introduced into a film type through-flow reactor preferably a continuous pressure film reactor. In said reactor and in a hydrogen atmosphere, at a temperature between 250–350° C. the reactants are allowed to react and the reaction mixture withdrawn for isolation of the desired borohydride. The separation of the reaction mixture is carried out in a filtering and extraction device preferably in a rotary pressure filter. In the first section of the rotary filter, the predominant portion of the liquid phase (oil) is filtered off and in the second section a counterflow extraction of the borohydride from the solid phase with liquid ammonia or an organic amine takes place. The ammonia (or amine) extract is thereafter fed into a spray drier yielding borohydride of analytical reagent grade.

In accordance with another embodiment of the invention where a technical grade alkali metal fluoroborate is used as one of the reactants, pure analytical grade fluoroborates are obtained by incorporating a pretreatment step prior to the homogenization step. Thus a technical fluoroborate is dissolved in water and the pH of the resulting solution adjusted to a value of less than 2.4 by means of hydrofluoric acid. The adjusted solution is then introduced into a spray drier, operated at a temperature of about 250° C. at the air inlet, and 90° C. at the air outlet. Pure fluoroborate is obtained, which is, subsequently, fed into the homogenizer to be homogenized with the other reactants prior to the proper reaction.

The thickness of the film in the pressure film-type reactor amounts to from 0.1 to 40 mm., preferably to from 0.5 to 5 mm.

The pressure applied will differ, substantially in dependency on the nature of the reactants used and their purity. For example, if sodium metal constitutes one of the reactants, a hydrogen pressure of from 1 to 10 atmospheres will be necessary to convert the metal into sodium hydride prior to the actual reaction. The same is the case with a sodium hydride which contains small amounts, or traces of sodium or other free metal. Preferably, the metal should be converted into the respective hydride, because the absence of any free alkali metal is highly desirable to allow ready isolation of the product.

Theoretically, overpressure of hydrogen is necessary only to prevent dissociation of the hydrides in the reaction mixture, assuming that absolutely no admixtures or free metals are present.

In those cases where hydrides without admixtures of free metals are used as reactants, or, where starting hydrides contain such a small amount of free metals that no difficulties are encountered in the course of the following processing, any suitable inert atmosphere may be used, for instance nitrogen, argon, solvent vapors and the like. In extreme cases, it is possible to avoid the use of any atmosphere in cases such a hydraulic pressure exists in the reaction mixture, which prevents the dissociation of the components of the reaction system.

The same is true for the temperature. It is dependent entirely on the reactants. It may be generalized that the reaction temperature lies in the case of sodium or potassium hydrides or metals as starting material within the range between 210° and 350° C. For complex sodium or potassium aluminum hydrides the reaction temperature range lies between 70 and 250° C., generally between 120 and 250° C.

For mixtures of an alkali metal hydride and the respective fluoroborate, the temperature may be assumed to be primarily dependent on the nature of the fluoroborate used. For example, if sodium hydride and sodium fluoroborate are the respective reactants the reaction temperature lies in the range of from 260 and 280° C.

For mixtures of a free alkali metal, fluoroborate and hydrogen, the reaction is clearly a two-step one, the two steps differing in the temperature. In the first step, free metal reacts with hydrogen to form metal hydride, which, subsequently, after the temperature has been further elevated, reacts with fluoroborate to form borohydride. For example, if sodium metal, sodium fluoroborate, and hydrogen are the reactants, the first step takes place at a temperature lying in the range between 220 and 230° C., the second at 260 to 280° C.

With respect to the concentration of reactants, the concentration of the solid phase should be as high as possible. The maximum is given by the viscosity of the mixture, which imposes limitations. Thus it is not dependent on the reactants. The optimum concentration lies in the range of from 20 to 25 weight percent of solid phase contained in the oil suspension. More concentrated suspensions do not behave as liquids—they are paste-like—and agglomerate owing to evaporation of a portion of the oil by reaction heat.

A suspension of a 30 percent by weight concentration still may be applied, however with certain difficulties. A suspension of a smaller than 20 percent by weight concentration is no more suitable for economic reasons, as it substantially reduces the capacity of the system. Lower than 5 percent concentrations show already a reduction in yield which is due to insufficient contact of the reactants.

Theoretically, the known stoichiometric ratio of the reactants (1 mole of fluoroborates to 4 moles of hydride or free metal) should suffice. It is advantageous, however, to use an excess of the alkali metal hydride and/or alkali metal. The optimum excess is about 10 mole percent of alkali hydride and/or alkali metal, i.e., the ratio fluoroborate: alkali hydride and/or alkali metal=1:4.4. This excess will prevent reaction of the product with the reactants, which might, occasionally, take place even in the thin layers process, due to the fact that in a suspension of two reactants, having different specific weights, local changes in concentration might take place according to the Stokes law, even if adequate counter-measures are provided. Such localized changes in concentration are also minimized by the use of high viscosity liquid media.

An excess of 10 mole percent suffices to compensate for these local changes in the concentration of the suspension and, hence, to prevent the following undesired concurrent reaction:

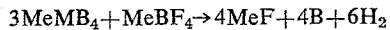

$$3MeMB_4 + MeBF_4 \rightarrow 4MeF + 4B + 6H_2$$

As to the reaction time, the reaction proceeds rapidly, at the very moment when the reaction mixture has reached the reaction temperature.

Referring now to the drawing and particularly to FIG. 1, it will be seen that from the containers 1, 2 and 3, the reactants alkali metal hydride and alkali metal fluoroborate, and paraffin oil respectively, are fed by the dosing apparatuses 5, 6 and the proportioning pump 4 respectively, into the milling apparatus 7. The milling apparatus 7 comprises a steel vessel, filled with steel balls, and provided with an efficient stirrer. The reactants and oil are fed into the milling device at the same rate at which the homogenized suspension is withdrawn at the bottom of the milling apparatus through pipeline 9. The level of the suspension in the milling device is kept constant, just high enough to ensure that all balls are submerged. The milling is carried out at atmospheric pressure. The dosing injector 10 imparts to the suspension the pressure necessary to inject the suspension into the reactor. The reaction mixture is injected onto the groove of the pulley-like distributor head, and by centrifugal forces of the said rotating head. It is hereby spread onto the walls of the reactor and flows down the walls thereof in a helical formed thin-layer. As can be more readily seen from FIG. 2, thermo-elements 54 are provided to measure the temperature of the reaction mixture. The reaction mixture is brought to the reaction temperature by heat transfer from the walls of the reactor, which, for their part, are heated by electrical heating elements 53.

The reacted suspension is withdrawn continually via pipe-line 15 and passed to the collecting tanks 18. One of the tanks is being filled under overpressure, whereas the other is simultaneously discharged under atmospheric pressure, this being regulated by means of valves 16, 17, 18, 19 respectively. The reaction mixture is fed via pipe-line 20 into the rotary pressure filter 27, in the first section of which oil is removed and discharged via pipe-line 29. In the next section, the mixture is washed with toluene, fed through pipe-line 25 from container 21. The mixture of the remaining oil and toluene is discharged via pipe-line 28. In the next section, the product is extracted with the usual extracting agents, i.e., preferably with liquid ammonia in the case of the production of sodium borohydride. Ammonia is fed from container 22 through the pipe-line 26. Ammonia extract is withdrawn via pipe-line 31 and, subsequently, fed into the spray-drier. In the last section of the filter, the filter residue is free of ammonia and, subsequently, discharged through waste-pipe 30. The only reactants or reaction products soluble in the extracting agent are the fluoroborates and the borohydride. Due to the use of an excess of alkali metal hydride there is no fluoroborate present in the reaction product and thus the extract contains only borohydride.

The spray-drier 37 is of a conventional commercially available type. The product is separated in the cyclone 39, from which it passes by gravity directly into the bottles or any other type of commercial packing.

Ammonia and the drying medium are exhausted by the exhaust pipe 41.

Valves 8, 12, 23, 24, 32 are provided between members of the line, working at different pressures. They are operated only, when starting, or shutting down the whole line.

Figure 2:
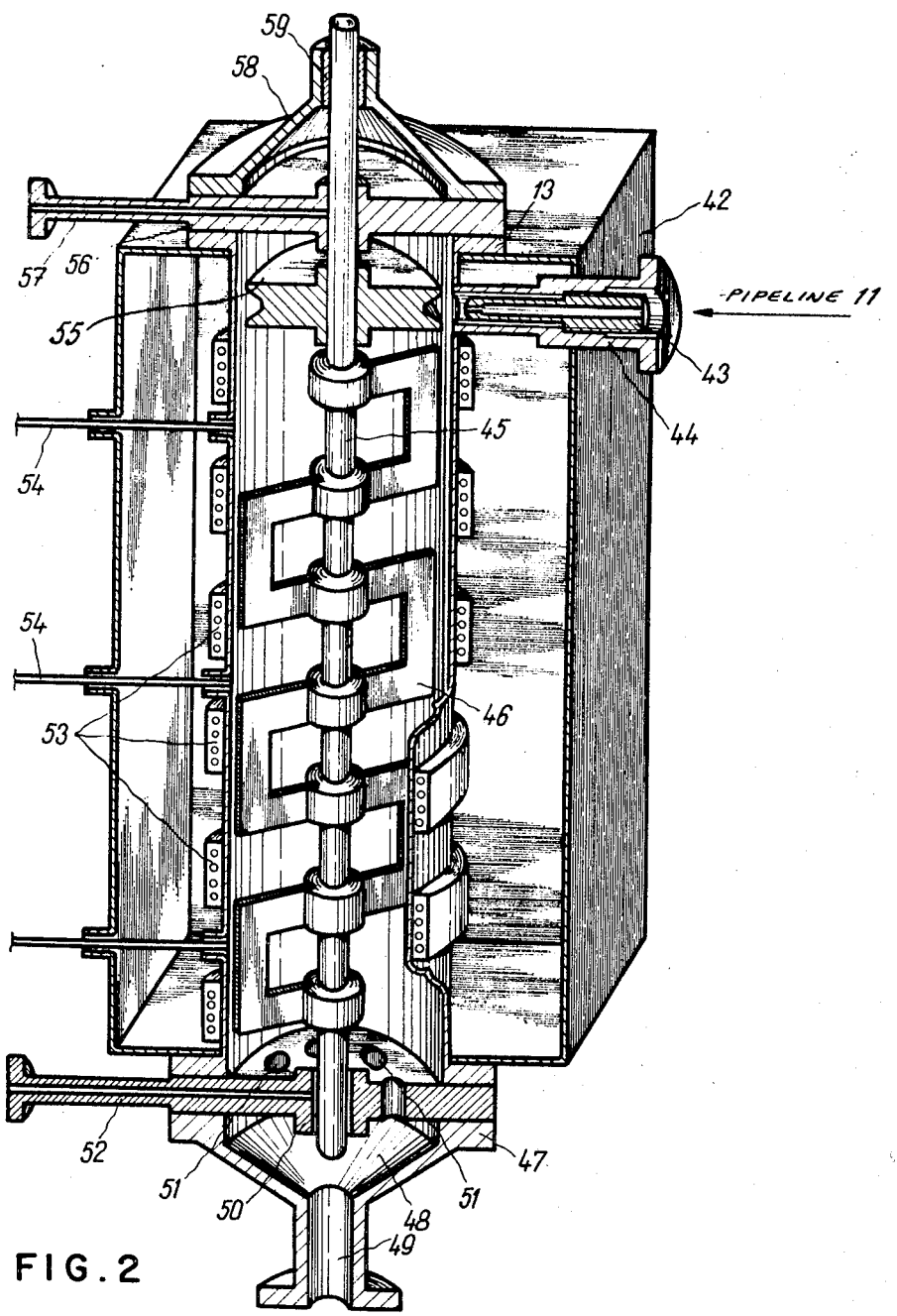
FIG. 2 is an axial sectional view of a pressure flow-type reactor which may be used for carrying out the process of the present invention.

The continuous film pressure reactor 13 is shown in more detail in FIG. 2.

It will be seen in FIG. 2, that the reactor comprises a projecting shield 42, a replaceable injection jet 43 for introducing the suspension of the reactants into the reactor, the jet being located in a replaceable jet body 44.

The reactor is provided with stirring equipment comprising an axially arranged stirrer shaft 45 to which stirrer blades 46, preferably of the illustrated configuration, are fixed. The reactor terminates in a bottom cover 47 including a conical spout arrangement 48 which in turn terminates in the outlet orifices 49.

Reference numeral 50 denotes the bottom shaft bearing for the stirrer, formed with passages 51 located in the bearing body for passage of reacted suspension therethrough.

Reference numeral 52 denotes an oil conduit for lubricating bearing 50.

The outer face of the reactor wall may be eletrically heated by conventional resistance heaters 53 which, however, may be replaced by other conventional heating means.

Reference numerals 54 indicate electric connections between heating means 53 and a source of electric current.

A distributor head 55 serves to evenly distribute the suspension introduced through element 43 along the upper portion of the inner face of the reactor wall.

Reference numeral 56 denotes the upper bearing for the shaft, and reference numeral 57 the conduit for supplying lubricating oil to bearing 56.

The upper end of the reactor is closed by cover 58 formed with a packed opening 59 through which the stirrer shaft extends towards an electric motor or other device for actuating rotation of the stirrer (not shown).

Figure 3:
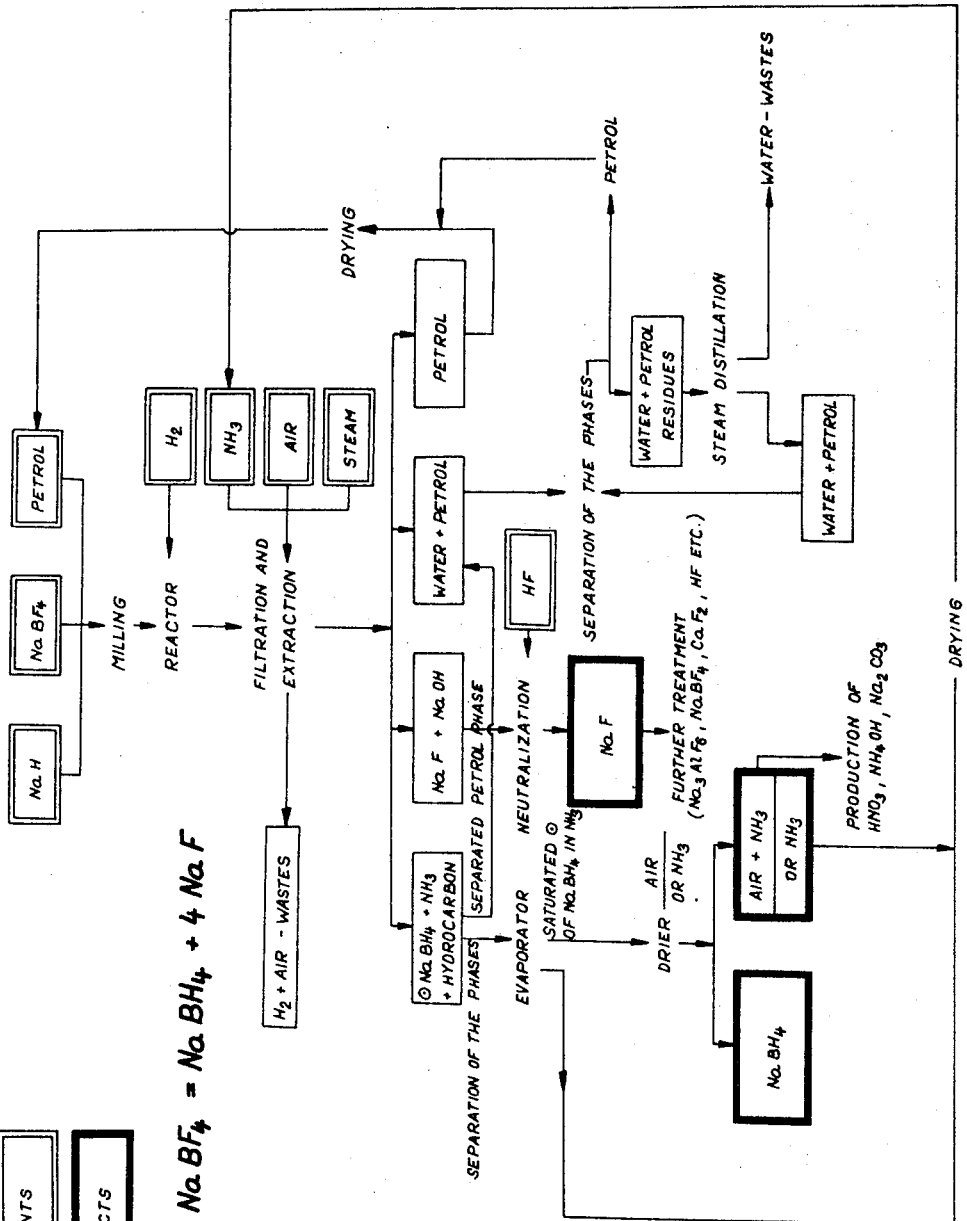
Figure 3:
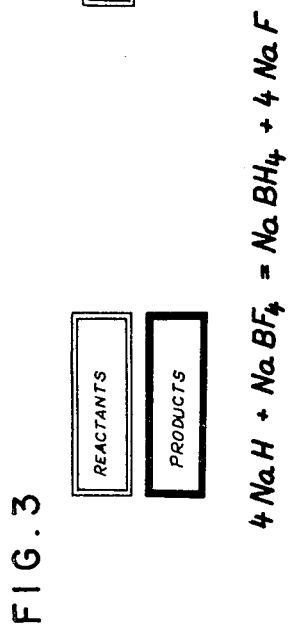

The flow sheet illustrated in FIG. 3 shows the process of the present invention in accordance with the reaction

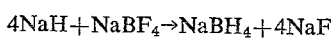

$$4NaH + NaBF_4 \rightarrow NaBH_4 + 4NaF$$

The flow sheet illustrated in FIG. 4 shows the process of the present invention in accordance with the reaction

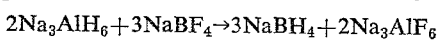

$$2Na_3AlH_6 + 3NaBF_4 \rightarrow 3NaBH_4 + 2Na_3AlF_6$$

The flow sheet illustrated in FIG. 5 shows the process of the present invention in accordance with the reaction

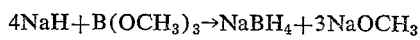

$$4NaH + B(OCH_3)_3 \rightarrow NaBH_4 + 3NaOCH_3$$

The flow sheet illustrated in FIG. 6 shows the process of the present invention in accordance with the reaction

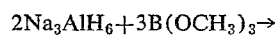

$$2Na_3AlH_6 + 3B(OCH_3)_3 \rightarrow 3NaBH_4 + 3NaOCH_3 + 2Al(OCH_3)_3$$

The following examples are given as illustrative only, without limiting the invention to the specific details of the examples.

EXAMPLE 1

A 30% aqueous solution of commercial grade sodium fluoroborate, containing 70% of $NaBF_4$ and 30% of $NaBF_3OH$ was adjusted to a pH of 2.3 by means of a 40% aqueous solution of hydrofluoric acid. This solution was then continually fed into a spray drier, operating at a temperature of 250° C. at the air-inlet and 90° C. at the air outlet.

One liter of the pretreated solution provided 300 g. of sodium fluoroborate of a 99.6% purity.

A milling device having a 50 liter working volume was charged with 35 kg. paraffin oil, 5.6 kg. sodium hydride (90%), and 5.2 kg. of sodium fluoroborate. Continuous withdrawal of the homogenized mixture was started after 2 hours milling at 450 r.p.m. Simultaneously, continuous feeding into the milling device of the oil and of the other two reaction components was started. The dilution rate amounted to ⅕ of the volume of the attritor per hour, i.e., about 7 liters per hour.

The withdrawn mixture was directly injected into a continual pressure film reactor in one continuous stream, the walls of which reactor having been heated to about 300° C. The dimensions of the reactor were 70 mm. x 750 mm., the stirrer revolved at 1500 r.p.m. and the rate of flow amounted to 7 liters per hour.

The reaction was carried out in a hydrogen medium at a pressure of 10 atmospheres so as to hydrogenate the metallic sodium, contained in the sodium hydride. Two reaction sections formed in the reactor, the one at 200 to 220° C., the other at 260 to 280° C.; these two temperature ranges are typical of the reactions Na→NaH and $NaBF_4$→$NaBH_4$ respectively. The thickness of the layer of the reactants in the thin film reactor amounted to from 0.5 to 1.5 mm. A 100% conversion of $NaBF_4$ to $NaBH_4$ was achieved, i.e., 51.5 g. of $NaBH_4$ was contained in the resulting oil suspension per 1000 ml. of oil.

The reacted suspension was then pumped into a rotary pressure filter, in the filtering section of which about 60 percent of the paraffin oil was removed. In the three following sections of the filter, a counter-flow extraction of sodium borohydride with liquid ammonia at 10 atmospheres took place from the solid phase that had been filtered off in the first section. Liquid ammonia was applied in a quantity of 3 to 5 kg. per 1 kg. of the solid filtered-off substance. The extract obtained formed two liquid phases (bottom layer—paraffin oil, upper layer—the ammonia extract containing about 30% of sodium borohydride), which were subsequently separated and the ammonia solution was directly dried in the spray drier at a temperature between 220° C. at the inlet of the gaseous drying medium and 120° C. at the exhaust pipe. The drying medium was ambient air. It is necessary that the air introduced be in a given ratio to the ammonia evaporated so as to form a non-explosive air-ammonia mixture.

The product is a fine powder of constant average weight which allows direct bottling of the product by means of a timer only. Thus the spray drier can function as the weighing device for final bottling in one operation only.

The yield of sodium borohydride was 350 g. per hour, i.e., 97% of the theoretical value as calculated on the basis of the amount of the reactants. The quality of the product was ascertained by means of the iodometric test and amounted to 99.3% of $NaBH_4$.

EXAMPLE 2

A suspension of 2160 g. of potassium fluoroborate and 960 g. of sodium hydride in a medium of 8500 g. of paraffin oil was homogenized in a ball-mill (type of attritor) until the particle size of the solid phase in the suspension attained a value of 1 to 2.

The suspension was fed into a film-type reactor of a working volume of 2.6 liters at a flow-rate of 7 liters per hour and at a temperature and pressure of 300° C. and 10 atmospheres of hydrogen respectively. The thickness of the layer of reactants in the thin film reactor amounted to from 0.5 to 1.5 mm.

Under these conditions, the reaction exhibited an exotherm of 40° C. and the analytical test (by means of iodometric titration) revealed an 80% conversion of the reactants into potassium borohydride.

The extraction of the product was carried out batchwise directly from the oil suspension by means of liquid ammonia and the product was obtained as pulverulent $KBH_4$ by evaporation of the solution thereof in liquid ammonia in a film type evaporator.

The borohydride obtained ($KBH_4$) was of a 98.7% purity and the yield amounted to 74%, calculated on pure borohydride.

The drying and packaging of the borohydride was carried out as described in Example 1.

EXAMPLE 3

In 1 hour, 1.04 kg. of methyl borate (1 mole), 1.06 kg. of NaH (4.1 moles) and 7.90 kg. of paraffin oil were continuously fed into a ball mill of a 20 liters working volume.

The suspension obtained was continuously fed by means of a monopump into a cylindrical film reactor (70 x 750 mm.) at a flow rate of 7 kg./hour.

The reaction

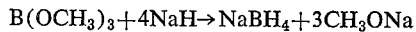

$$B(OCH_3)_3 + 4NaH \rightarrow NaBH_4 + 3CH_3ONa$$

proceeded at a temperature of 260° C. under considerable heat evolution and the temperature of the reaction mixture rose spontaneously by 35° C.

38% conversion of $NaBH_4$ was ascertained by iodometric test (33.5 g. of $NaBH_4$ per 1 kg. of the suspension)

$NaBH_4$ was isolated by extraction with liquid ammonia in the same way as described in Example 1. Subsequent to spray drying, 307.8 g. of $NaBH_4$ was obtained per 10 kg. of the starting suspension which corresponds to a 81% yield, based on the initial quantity of methyl borate.

Sodium borohydride may be prepared in accordance with the present invention in a particularly advantageous manner by reacting a boron compound with a complex alkali metal aluminum hydride, preferably with trisodium-aluminum-hexahydride of the formula $Na_3AlH_6$, which may be used in its pure form or as a mixture with $NaAlH_4$.

It may be mentioned at this point that suitable boron compounds which may be used as starting material for producing sodium or more generally alkali metal-borohydride, include boron halides, preferably boron chloride or fluoride, alkali metal fluoroborates or chloroborates, or compounds corresponding to the alkali metal fluoroborates in which, however, the alkali metal has been replaced, for instance, with $[(CH_3)_3O]^+$. Other suitable boron compounds for the purpose of the present invention are the trimethyl ester of boric acid $(CH_3O)_3B$, the methyl ester of metaboric acid $(CH_3OBO)_3$, alkali metal borates, etc. Also natural borates such as borax may be used as the starting material in accordance with the present invention.

Broadly, all boron compounds may be used which are capable of reacting with alkali metal hydrides or aluminum hydrides. The reactions are somewhat similar, however, the reaction temperatures differ, while the reaction temperatures broadly are between 70 and 320° C., the reaction temperature preferably will be between about 260 and 280° C. when the reaction is carried out with alkali metal hydrides as the hydrogenating agent, and at temperatures between about 160 and 170° C., when utilizing sodium-aluminum hydrides, particularly $Na_3AlH_6$ as the hydrogenating agent.

When carrying out the reaction with alkali metal aluminum hydrides and particularly with trisodium aluminum hexahydride, the maximum reaction temperature should not exceed about 200° C., and the reaction is preferably carried out in a hydrogen atmosphere or an inert atmosphere. The initiation temperature of the reaction between the boron compound and the sodium aluminum hydride is between about 160 and 170° C., a rather low temperature. The reaction may be carried out continuously or discontinuously, provided that a reaction between the already produced finished product, i.e., alkali metal borohydride and not yet reacted reactants is prevented.

Although preferably $Na_3AlH_6$ is used as the hydrogenating agent, it is also possible to carry out the conversion of the boron compound into the alkali metal borohydride with $NaAlH_4$ as the hydrogenating agent, in accordance with the thin layer reaction of the present invention. While it is preferred to carry out the reaction with $Na_3AlH_6$ as the hydrogenating agent, frequently it is more advantageous to utilize mixtures of $Na_3AlH_6$ and $NaAlH_4$ as the hydrogenating agent, particularly since technical $Na_3AlH_6$ generally contains up to 20% $NaAlH_4$.

When carrying out the reaction in a discontinuous manner, special care must be taken to provide a very efficient homogenizing of the reaction mixture during the heating of the mixture to the reaction temperature so as to prevent the reaction between the alkali metal borohydride and not yet reacted reactants; in other words, the whole of the batch must attain the reaction temperature at the very same moment so that the reaction is instantaneous throughout the whole of the batch. The said purpose is preferably achieved by carrying out the reaction in a rotating pressure vessel whereby a relatively thin reaction layer will be formed by centrifugal force.

The same holds true with respect to the continuous process. In the latter case the reaction layer should be sufficiently thin to allow for substantially simultaneous reaction within any given cross section of the layer in order to prevent reaction between the reactants and the reaction product.

The reaction between the boron compound and the alkali metal hydride or alkali metal aluminum hydride is carried out, in accordance with the present invention, in a thin layer formed of an appropriate liquid having the reactants, i.e., the hydride and the boron compound finely and as homogeneously as possible distributed therethrough. Such dispersion is then passed in a relatively thin layer through a reaction zone and heated during such passage to the reaction temperature. The appropriate liquids for this purpose include hydrocarbons, such as paraffinic, cycloparaffinic and aromatic hydrocarbons having a critical temperature above the reaction temperature, for instance lacquer benzene, i.e., mineral spirits, xylene, toluene, paraffin oil, etc. It is also possible to use certain ethers, but generally it will be more advantageous from a technical and economical point of view to use hydrocarbons. A preferred ether for the purpose of the present invention is diglyme, i.e., diethylene glycol dimethyl ether.

Thus, the liquid reaction medium, irrespective of which of the hydrogenating agents of the present invention is utilized, may be a mineral oil or any other hydrocarbon which is liquid at the reaction temperatures and which may or may not be steam distillable and which has a critical temperature higher than the reaction temperature and which, furthermore, is inert with respect to the reactants and the reaction product. The ethers which may be used as the liquid reaction medium are preferably those which are capable of dissolving the reaction product, i.e., the alkali metal borohydride, and thus ethers which act as solvent for the reaction product (but not for the reactants), may be used even if they are not steam distillable, provided their critical temperature is higher than the reaction temperature and further provided that these ethers are chemically inert with respect to the reactants and reaction products.

It is advantageous to carry out the hydrogenation of the boron compound subsequent to homogenization and/or milling of the starting material in the liquid medium, in a continuous film reactor in a thin layer, the thickness of which layer generally should be between 0.1 and 40 mm., usually not more than 20 mm., and preferably between 0.5 and 5 mm.

Carrying out the reaction in a thin, preferably flowing, layer will cause an instantaneous complete reaction of the reactants under formation of the alkali metal borohydride and, in the case of a flowing layer, immediate withdrawal of the thus-formed reaction product from the reaction zone so that there will be no substantial contact between the reaction product and as yet unreacted reactants in subsequent portions of the thin layer or film.

This may be accomplished in accordance with the present invention by carrying out the reaction in such thin layer or film of reactants suspended in a suitable liquid as described above, and it is achieved thereby that the reacted mixture will be promptly withdrawn from the reaction zone and contact between the reaction product and as yet not reacted starting material or reactants will be substantially avoided.

When carrying out the reaction in a discontinuous manner, special care must be taken to provide a very efficient homogenizing of the reaction mixture during the heating of the mixture to the reaction temperature so as to prevent the reaction between the alkali metal borohydride and not yet reacted reactants; in other words, the whole of the batch must attain the reaction temperature at the very same moment so that the reaction is instantaneous throughout the whole of the batch. The said purpose is preferably achieved by carrying out the reaction in a rotating pressure vessel. Other well-known methods of effective homogenization, however, may be used during the heating of the reaction mixture to achieve this purpose, such as high-speed stirring of the reaction batch.

It is generally advantageous to use somewhat more than the stoichiometric required amount of the hydrogenating agent, such as between about 110% and 130% of the hdyrogenating agent such as the sodium aluminum hydride. An excess of the hydride, for instance trisodium aluminum hexahydride, over the boron compound is preferred, although it is also possible to carry out the reaction of the present invention with a stoichiometric excess of the boron compound over the hydrogenating agent. However, in the latter case the alkali metal borohydride such as sodium borohydride will be produced in lower yield and lesser purity.

The preferred hydrogenating agent presently discussed, namely $Na_3AlH_6$ can be made easily available in a most economical manner and, consequently, production of alkali metal and particularly sodium borohydride can be carried out in a highly effective manner and with optimum yields by using trisodium aluminum hexahydraide as the hydrogenating agent. It is even possible to work at atmospheric pressure and in the absence of hydrogen and this again is a very significant technological advantage over other methods of producing sodium borohydride. The pressure in the reactor is primarily a function of the vapor pressure of the liquid medium or solvent under the prevailing reaction conditions. Even in carrying out the reaction with a crude reaction mixture of trisodium aluminum hexahydride and sodium aluminum tetrahydride as obtained in the direct synthesis of trisodium hexahydride, optimum yields will be obtained. Another very substantial advantage of utilizing predominantly or exclusively trisodium aluminum hexahydride as the hydrogenating agent is the relatively low initiation temperature of about 160 and 170° C.

The trisodium aluminum hexahydride may be produced by reacting sodium and aluminum, preferably in an atomic ratio of substantially 3:1, with pressure hydrogen at elevated temperatures, whereby the sodium may be replaced by an equivalent amount of sodium hydride. A method of producing $Na_3AlH_6$ is more fully described in copending U.S. patent application Ser. No. 449,893 by Mamula et al., which application has been assigned to the assignee of the present application and the contents of which are incorporated herein by reference.

The following examples will serve to describe in more detail specific manner of producing sodium borohydride or other alkali metal borohydrides utilizing trisodium aluminum hexahydride as the hydrogenating agent, and again, the present invention is not to be considered limited to the specific details of the example.

EXAMPLE 4

220 grams of $Na_3AlH_6$ (2.2 moles) were ground and homogenized together with 330 grams of $NaBF_4$ and 2200 grams of paraffin oil. Homogenization and grinding were carried out in conventional attritor type milling equipment and a suspension was obtained the solid phase of which amounted to 20% by weight thereof.

The thus obtained homogeneous suspension was then injected into a continuous film reactor to form therein a layer of 0.2 mm. thickness, and was then heated in this form at a temperature of 200° C. The hydrogenation reaction was practically immediate and exothermic, and proceeded in accordance with the following reaction:

$$2Na_3AlH_6 + 3NaBF_4 \rightarrow 3NaBH_4 + 2Na_3AlF_6$$

The byproduct, $Na_3AlF_6$ obtained thereby is a valuable raw material for the production of aluminum metal.

From the thus reacted mixture, the solid phase was separated in a conventional separator and the reaction product, i.e., the sodium borohydride extracted from the separated solid phase with liquid ammonia as the extracting liquid. Ammonia as the extracting liquid may be replaced by primary amines such as methyl amine, ethylamine, propylamine and preferably isopropylamine.

If the sodium borohydride is to be used in the form of a solution thereof, so that it would not be necessary to remove the solvent, advantageously pyridine, cyclohexylamine or ethylenediamine may be used as solvents, or also lower aliphatic alcohols or water—provided that such alcohols or water contain in solution NaOH, $Na_2CO_3$ or sodium alcoholates, preferably in amounts of 1–10% by weight.

The ammonia or amine extract was dried in a conventional spray drier and, in this manner, 100 grams of $NaBH_4$ were obtained having a purity of 98% so that the yield based on the initially introduced boron compound amounted to 86%.

The above described method may also be modified for the preparation of other alkali metal borohydrides. Thus, for instance, if the reactant $NaBF_4$ is replaced by an equivalent amount of $KBF_4$, potassium borohydride of the formula $KBH_4$ will be produced.

EXAMPLE 5

To 833 grams of a crude reaction mixture from the direct synthesis of trisodium aluminum hexahydride, as received by pressure reaction in a rotatable autoclave of sodium, aluminum and hydrogen in toluene (containing 277.7 grams of the active substance in toluene, i.e. 33%), 330 grams of sodium fluoroborate and 2500 ml. of toluene were added into the autoclave.

The autoclave was heated under continuous rotation during a period of 30 minutes to a temperature of 160° C. Due to the continuous rotation, the reaction mixture formed a film of about 5 mm. thickness on the inner wall of the vessel. Although the heating was discontinued after reaching a temperature of 160° C., the temperature rose spontaneously to 200° C. due to the exothermic reaction. Upon cooling, the solid phase was separated from the reaction mixture in a conventional separator and the thus formed sodium borohydride extracted from the solid phase with liquid ammonia. The ammonia extract was dried in a spray drier by means of hot air and 100 grams of $NaBH_4$ were obtained having a purity of 97%, hence, in an 85% yield.

EXAMPLE 6

220 grams of $Na_3AlH_6$ and 168 grams of $B(OCH_3)_3$ were milled together in 1200 grams of lacquer benzene in an attritor type mill for 2 hours at 60° C. and under nitrogen of atmospheric pressure.

Subsequent to milling, the mixture was brought into a rotating pressure vessel forming therein a film of about 20 mm. thickness, and heated over a period of 25 minutes to a temperature of 150° C., at which temperature a considerable proportion of the reaction heat was spontaneously released.

The reaction proceeded in accordance with the following equation:

$$2Na_3AlH_6 + 3B(ACH_3)_3 \rightarrow 3NaBH_4 + 2Al(OCH_3)_3 + 3NaOCH_3$$

Upon cooling, the solid phase was separated by centrifuging and sodium borohydride was extracted from the separated solid phase with liquid ammonia. The extract was dried in a spray drier with gaseous ammonia as the heating fluid at a temperature of 200° C. at the gas inlet and 130° C. at the exhaust. The product was flushed into the collecting vessel with a tenfold volume of dry nitrogen, and 115.3 grams of $NaBH_4$ of 89% purity were obtained, corresponding to a 90% yield calculated on the starting boric compound.

EXAMPLE 7

In an attritor mill, 234.6 grams $Na_3AlH_6$ (2.3 moles) and 330 grams $NaBF_4$ (3 moles) were thoroughly homogenized in a medium of 1200 grams diglyme. The mixture was charged into a rotating pressure vessel forming therein a film of about 10 mm. thickness, whereupon on heating the reaction proceeded at 120° C.

The reaction mixture was separated by filtration, the filter cake washed thoroughly with 3 times 200 grams of diglyme and the liquid portions and the main liquid phase collected together.

This procedure yielded 1700 grams of a solution of $NaBH_4$ in diglyme. The solution was concentrated in vacuo at 70° C. to a volume of 300 ml., and, at 60° C., crystals were separated, which subsequent to washing with hexane and drying, gave 89.4 grams of $NaBH_4$ of 90% purity. The yield was 70% calculated on the starting amount of $NaBF_4$.

The solution of $NaBH_4$ in liquid ammonia which may be formed in accordance with the present invention, may then be advantageously separated into the sodium borohydride and ammonia by spray drying with ammonia vapor as the heating fluid. This may be carried out in such a manner that the dry sodium borohydride is withdrawn from the spray dried and, of the simultaneously withdrawn ammonia vapors, a portion corresponding to the amount of liquid ammonia which is introduced into the spray drier is passed to an exhaust or the like, whereas a residual portion of ammonia vapors is withdrawn from the spray drier and passed through a preheater and from there reintroduced into the spray drier to seve as heating fluid during the drying of subsequent portions of the solution of sodium borohydride in liquid ammonia.

It is also within the scope of the present invention to provide a method for producing borohydrides of alkali metals, especially of sodium, and of borohydrides of alkaline earth metals, by the reaction of the respective components that had been pre-milled together, i.e., of boron-containing substances, e.g., of a fluoroborate or certain boric esters and of a simple or a complex hydride (which may be replaced by the respective metal that will afford—in the presence of hydrogen—the respective simple hydride), in the presence of such a liquid hydrocarbon that may be regenerated by steam distillation, the critical temperature of the said hydrocarbon must be higher than the maximum temperature to which will rise the reaction mixture during the conversion to borohydride. Aliphatic and aromatic hydrocarbons may be used for this purpose, such as lacquer benzene, toluene, xylene, etc.

Suitable boron compounds include $NaBF_4$ and $KBF_4$ or mixtures thereof; or $B(OCH_3)_3$, $NaB(OCH_3)_4$ and $NaBH(CH_3)_3$ and mixtures of the last mentioned three compounds.

In the said hydrocarbon medium, the reactants are preferably pre-milled together and subsequently introduced into a pressure-film-reactor. Their mutual reaction (the reaction between the boric component and the hydride) must be quantitative with respect to the boric component, i.e., substantially the entire boric component should be reacted; insofar as introducing into the reactor a reaction mixture, the reaction of which does not proceed quantitatively, the by-products will necessarily be contaminated with the reactants, thus rendering a further treatment rather complicated. From the reaction mixture which substantially consists of a suspension of the alkali-metal borohydride and of the reaction by-product, the borohydride is extracted. The solid by-product, which will remain in the suspension of the respective auxiliary medium is then, preferably subsequent to a separation of the preponderant portion of the said medium (e.g., by filtration), separated from the residual portion of the said medium adhering thereto, by steam distillation.

In this manner, a complete recovery of the starting materials is made possible as indicated in the FIGS. 3 to 6.

EXAMPLE 8

1.04 kg. of methyl borate (1 mole), 1.06 kg. of sodium hydride (4.1 moles) and 7.90 kg. of xylene was continuously fed across 1 hour into a ball mill of a 20-liters working volume.

The suspension obtained was continuously fed by means of a monopump into a cylindrical film reactor (70 x 750 mm.), at a flow rate of 7 kg./hour.

The reaction

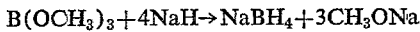

$$B(OCH_3)_3 + 4NaH \rightarrow NaBH_4 + 3CH_3ONa$$

proceeded at a temperature of 260° C. under considerable heat evolution and the temperature of the reaction mixture rose spontaneously by 35° C.

88% conversion of $NaBH_4$ was ascertained by iodometric test (33.5 g. of $NaBH_4$ per 1 kg. of the suspension). The reaction mixture was treated as indicated by FIG. 5; 1.2–1.3 kg. of steam was consumed per 1 kg. xylene.

$NaBH_4$ was isolated by extraction with liquid ammonia; subsequent to spray drying of the extract, 307.8 g. of $NaBH_4$ was obtained per 10 kg. of the starting suspension which corresponds to a 81% yield, calculated on the starting methyl borate.

EXAMPLE 9

A 30-percent aqueous solution of a commercial grade $NaBF_4$ containing 70 percent of $NaBF_4$ and 30 percent of $NaBF_3OH$ was adjusted to a pH of 2.3 by means of a 40-percent solution of hydrofluoric acid. The solution that had been adjusted in this manner was continually fed into a spray dryer, working at a temperature of 250° C. at the air-inlet and 90° C. at the air outlet.

A liter of the pretreated solution afforded 300 g. of sodium fluoroborate of a 99.6-percent purity.

A milling device having a 50 liter working volume was charged with 35 kg. petrol, 5.6 kg. sodiumhydride (90-percent), and 5.2 kg. sodium fluoroborate. Continuous withdrawal of the homogenized mixture was started after 2 hours milling at 450 r.p.m.; simultaneously continuous feed of the petrol and the other two reaction components was started. The dilution rate amounted to ⅓ of the volume of the atrittor per hour, i.e. about 7 liters per hour.

The withdrawn mixture was immediately continuously injected into a film reactor, the walls of which were being heated to about 300° C. The dimensions of the reactor were 70 mm. x 750 mm., the stirrer revolved at 1500 r.p.m. and the rate of flow amounted to 7 liters per hour. The reaction was carried out in a hydrogen medium at a pressure of 10 atmospheres, so as to hydrogenate the metallic sodium, contained in sodium hydride. Two reaction ranges formed in the reactor, the one at 200 to 220° C., the other at 260 to 280° C., which are typical of the reactions $Na \rightarrow NaH$ and $NaBF_4 \rightarrow NaBH_4$, respectively. A 100-percent conversion of $NaBF_4$ to $NaBH_4$ was achieved, i.e. 51.5 g. of $NaBH_4$ was contained in the resulting suspension per 1000 ml. of petrol.

The reacted suspension was pumped into a rotary pressure filter, in the filtering section of which about 60 percent of the petrol was removed. In the three following sections of the filter, a counter-flow extraction of sodium borohydride with liquid dry ammonia at 10 atmospheres took place, from the solid phase that had been filtered off. Liquid ammonia was applied in a quantity of 3 to 5 kg. per 1 kg. of the solid substance filtered-off. The extract obtained formed two liquid phases (bottom layer—benzine, upper layer—the ammonia extract containing about 30 percent of borohydride), which were subsequently separated and the ammonia solution was directly dried in the spray drier at a temperature between 220° C. at the inlet of the gaseous drying medium and 120° C. at the exhaust. The treatment of the petrol fractions and of the solid residue from the extraction step was carried out in the manner indicated in FIG. 3.

The yield on sodium borohydride was 350 g. per hour, i.e. 97 percent of the theoretical value as calculated on the basis of the amount of the reactants. The quality of the product was ascertained by means of the iodometric test and amounted to 99.3% of $NaBH_4$.

It is a further object of the present invention to carry out the said extraction of sodium borohydride by means of extracting agents different from liquid ammonia or amines, i.e., by means of a countercurrent extraction with water having a pH above about 10 or with diluted sodium hydroxide. Alkalinization of the extraction water may be achieved by the decomposition of residual NaH.

When sodium fluoride represents the respective by-product, a small portion of the by-product will pass over into the extract together with the borohydride (about 4%) and it must be removed preferably by precipitation with a $Ca^{2+}$ ion. For the said purpose, a slight excess of a calcium chloride solution may be used

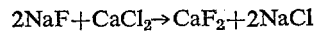

$$2NaF + CaCl_2 \rightarrow CaF_2 + 2NaCl$$

or, use may be made of a water suspension of $Ca(OH)_2$; the precipitation calcium fluoride is readily separated by filtration or centrifugation.

When $Na_3AlF_6$ is the respective by-product (i.e., when $Na_3AlF_6$ was used as one of the reactants), the mentioned treatment of the water extract is not necessary, owing to the fact that $Na_3AlF_6$ is insoluble in water and, hence, it does not pass into the extract at all. This fact is especially advantageous when a stabilized aqueous solution of sodium borohydride is to be prepared for the uses in paper industry. It is of importance, however, also in the preparation of sodium borohydride of technical-grade purity which may be readily obtained from the said water extract, by simply drying the extract in a spray-drier.

EXAMPLE 10

110 kg. $NaBF_4$ and 100 kg. NaH was suspended in 790 kg. xylene—which corresponds to a 21% concentration of the solid phase in the auxiliary medium—and the mixture was continually milled in an atrittor mill to achieve a particle size value of 1 to 5μ.

The thixotropic mixture obtained was continually injected into a through-flow filmreactor heated to a temperature of 300° C. After the reaction mixture had attained a temperature of 270° C., the temperature of the mixture rose spontaneously by ca. 33° C.

The mixture withdrawn from the reactor showed a much coarser grain. Upon cooling, 3.7% of $NaBH_4$ was proved analytically in the mixture which corresponds to 97.5% conversion of the fluoroborate to the borchydride.

The reaction mixture was fed continually into a stirrer-equipped container adapted for stirring highly viscous liquids, in which container efficient homogenization with an aqueous solution of sodium borohydride was carried out, the latter solution having been obtained by a countercurrent extraction of a filter cake in the sectional pressurized filter described below. The homogenized mixture was continuously withdrawn and continuously fed into the first section of the said pressurized sectional filter, wherein actual filtration took place, whereas into the next four sections of the pressurized filter, a 4% aqueous solution of NaOH was fed countercurrently, in the quantity of 300 kg. per 1000 kg. of the reaction suspension. The water solution of $NaBH_4$ withdrawn from the last section of the countercurrent extraction was then fed into the stirring container as described above; the crude extract was obtained subsequently to the separation of the hydrocarbon phase after the first section of filtration. It was analytically ascertained that the solution contained 12% $NaBH_4$, i.e., that 97.5% of the borohydride that had been obtained in the conversion step was extracted, which corresponds to a total yield of 95%, calculated on the starting fluoroborate.

The analysis revealed also a 4.1% content of sodium fluoride in the crude extract thus obtained. Subsequently the crude solution was mixed in a tank with a suspension of $Ca(OH)_2$. Per 100 liters of the extract, 3.8 kg. of $Ca(OH)_2$ in an aqueous suspension had to be applied. The precipitated calcium fluoride was continually removed from the solution on a rotary filter; a stabilized aqueous solution of $NaBH_4$ was obtained, containing 12% of $NaBH_4$.

EXAMPLE 11

The 12% solution of $NaBH_4$, obtained in the preceding example was dried in a spray-drier at a temperature of 305° C. at the inlet and 131° C. at the exhaust. The yield was 69 kg. of a product with a purity of 52.5%, which corresponds to 94% calculated on the starting product.

The powdered product obtained was pelletized on a tabletting machine.

EXAMPLE 12

The powdered product obtained in the preceding example was treated by a countercurrent extraction with liquid ammonia under overpressure and the resulting extract having a concentration of 31% sodium borohydride was dried in a spray-drier at a temperature of 225° C. at the inlet and 125° C. at the exhaust. The pure product obtained was 99%, recovered in a 90% yield.

From the sodium borohydride of a technical-grade purity, chemically pure sodium borohydride may be, of course, obtained, whenever desirable, by extraction with liquid ammonia or isopropylamine on subsequent drying of the extract in a spray drier.

Without limiting the invention to any specific theory, it may be assumed that the metal borohydride is formed by an ionic reaction:

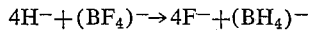

The source of the H⁻ anion may be NaH, KH or complex metal hydrides containing anions $(AlH_4)^-$ or $(AlH_6)^{3-}$.

Similarly, it is also possible to carry out the reaction with 3-alkoxy boron compounds as the boron-containing starting material as follows:

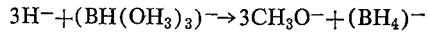

The reactants serving as the starting material indicated by the ionic reaction equations above are preferably ground together, either in the presence of the inert carrier liquid or the reactants may be first ground and then incorporated in the inert liquid.

The reaction temperatures differ, however, depending on the metal hydrides used as starting materials and preferably will be between about 140 and 180° C. in the case of complex aluminum hydrides such as $NaAlH_4$ and $Na_3AlH_6$ and between about 260 and 280° C. if simple alkali metal hydrides, i.e., NaH or KH are used.

The ions produced in the above ionic reactions, namely, F⁻, $(CH_3O)^-$ and $BH_4^-$ react immediately with the metal cations (Me⁺) such as Na⁺ or K⁺ in the reaction mixture to form the corresponding salts MeF or $MeOCH_3$ or mixtures thereof, depending on the type of boron-containing starting compounds. Simultaneously, the desired end product, namely, $MeBH_4$ will be formed during this substantially instaneous reaction.

Since the $(BH_4)^-$ ion has a very weak acidic character, this ion will preferentially react with the stronger available alkali metal ion. Consequently, if Na⁺ and K⁺ are both present in the reaction mixture, preferentially $KBH_4$ will be formed, for instance in accordance with the following equations:

$$4NaH+KBF_4 \rightarrow KBH_4+4NaF$$

$$4NaH+NaBF_4 \rightarrow NaBH_4+4NaF$$

$$2Na_3AlH_6+3NaBF_4 \rightarrow 3NaBH_4+2Na_3AlF_6$$

$$NaAlH_4+KBF_4 \rightarrow KBH_4+NaAlF_4$$

$$4KH+NaBF_4 \rightarrow KBH_4+3KF+NaF$$

Compounds including the ion $[BH(OCH_3)_3]^-$ may be easily prepared from the methyl ester of boric acid $B(OCH_3)_3$ by reaction of the latter with NaH or KH or $MeB(OCH_3)_4$, wherein Me may be Na or K, for instance as follows:

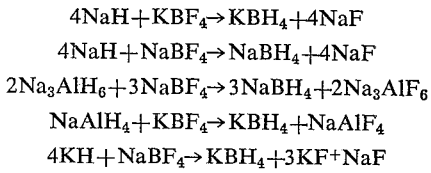

This will explain the possibility of using also $B(OCH_3)_3$ as a starting material.

The essential condition which has to be met according to the present invention for carrying out the reactions described in the ionic equations above is that reactions between the reaction product and as yet unreacted starting or intermediate products must be prevented. In other words, the freshly formed end products of the reaction must be protected from contact with starting materials at reaction temperatures.

This is accomplished by carrying out the reaction in accordance with the present invention in a relatively thin flowable layer which can be heated in such a manner that the reaction temperature will be reached at the same time throughout the entire cross section of the flowable layer located in the reaction zone.

The side reactions which are prevented by proceeding as outlined above include the following:
 (a) if $MeBF_4$ is used:

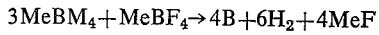

(b) if $B(OCH_3)_3$ $Me[B(OCH_3)_4]$ or

are used:

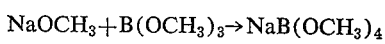

It will be readily understood that these side reactions if they were permitted to occur would substantially decrease the yield and reduce the purity of the desired metal borohydride.

At 220 to 300° C., the following two side reactions may also proceed simultaneously in the reaction mixture:

The former of the two above reactions is irreversible, the latter, however, a reversible one. This is why contact between as yet unreacted reactants and the product should be avoided also in the methyl borate methods, disregarding whether $B(OCH_3)_3$, $MeB(OCH_3)_4$, $MeBH(OCH_3)_3$, $(OBOCH_3)_3$ or their mixtures are used as the boron containing starting reactant since they all will afford the same intermediates under the reaction conditions. It is to prevent unnecessary increase in the concentration of $MeOCH_3$ in the reaction mixture before the reaction has been completed /Guldberg-Waags principle/.

Without further analysis, the foregoing will so fully reveal the gist of the present invention that others can by applying current knowledge readily adapt it for various applications without omitting features that, from the standpoint of prior art, fairly constitute essential characteristics of the generic or specific aspect of this invention and, therefore, such adaptations should and are intended to be comprehended within the meaning and range of equivalence of the following claims.

What is claimed as new and desired to be protected by Letters Patent is set forth in the appended claims.

We claim:

1. The process of making alkali metal borohydrides comprising the following steps carried out in continuous succession:
   (1) intimately dispersing (a) an alkali metal, a hydride thereof or trisodium - aluminumhexahydride and (b) an alkali metal fluoroborate in a liquid inert medium;
   (2) homogenizing the dispersion; then
   (3) continuously agitating the dispersion while at the same time causing it to form a thin film having a thickness from 0.1 to 0.20 mm. and at the same time introducing hydrogen into the dispersion; then
   (4) causing the said film to move through an initial reaction zone where it is heated to about 200–220° C. when an alkali metal or a hydride thereof is employed as one of the starting products, and to 160–170° C. when the sodium-aluminum hydride is used as one of the starting products; then
   (5) causing the film to move through a final reaction zone where it is heated to a temperature higher than said initial temperature; and
   (6) causing the removal of the film from said final reaction zone substantially instantaneously upon formation of the alkali metal borohydrides and with minimum contact between the said hydride and the unreacted starting products; and finally
   (7) filtering and washing the mass and extracting the solid alkali metal borohydride therefrom.

2. The process of claim 1, wherein an alkali metal or a hydride thereof is employed as one of the starting products and wherein the film formed of the dispersion has a thickness between 0.5 and 5 mm. and the temperature in the final reaction zone is between 260 and 280° C.

3. The process of claim 1, wherein $Na_3AlH_6$ is employed as one of the reaction products and wherein the film has a thickness of 0.2 to 10 mm. and the temperature employed in the final reaction zone is up to 200° C.

4. The process of claim 1, wherein the said extraction is effected with ammonia or a liquid amine in which said final alkali borohydride is soluble.

5. The process of claim 1, wherein the said dispersion and the film formed thereby is subjected to a continuous state of turbulence until it has passed out of said final reaction zone.

6. The process of claim 1, wherein the said film is formed by subjecting the dispersion to continuous centrifugal action.

7. The process of claim 1, wherein the moving of said film and the removal thereof from the final reaction zone are obtained by gravity.

8. The process of claim 1, wherein the average specific surface of the said alkali metal, hydride thereof or sodium-aluminum hydride and of said alkali metal fluoroborate employed as starting products is at least 1.4 m.²/g.

9. The process of claim 1, wherein the obtained alkali metal borohydride following the extraction is subjected to spray drying so as to obtain a fine powder product.

10. The process of claim 1, wherein the alkali metal fluoroborate used as starting material is treated prior to incorporation in the said dispersion by forming an aqueous solution thereof and acidifying the solution with hydrofluoric acid until a pH is obtained below 2.4 followed by spray drying of the solution.

11. The process of claim 2, wherein the inert reaction medium is a paraffinic, cycloparaffinic or aromatic hydrocarbon having a critical temperature above said final reaction temperature and is a steam-distillable liquid.

12. The process of claim 1, wherein said liquid medium is a mineral spirit, toluene or xylene.

References Cited

UNITED STATES PATENTS

| | | | |
|---|---|---|---|
| 2,133,735 | 10/1938 | Waterman et al. | 23—1 X |
| 2,744,810 | 5/1956 | Jackson | 23—362 |
| 2,929,676 | 3/1960 | Schechter | 23—362 X |
| 2,970,114 | 1 1961 | Bragdon | 23—362 X |
| 3,002,806 | 10/1961 | Governale et al. | 23—362 |
| 3,355,262 | 11/1967 | Beaird et al. | 23—365 |
| 3,395,990 | 8/1968 | Ballestra | 23—284 |

FOREIGN PATENTS 548,676  11/1957  Canada.

OSCAR R. VERTIZ, Primary Examiner

G. O. PETERS, Assistant Examiner

U.S. Cl. X.R.

23—1, 283